（12） United States Patent
Curchod

(10) Patent No.: US 10,086,252 B2
(45) Date of Patent: Oct. 2, 2018

(54) SYSTEM AND METHOD FOR RANKING OF GOLF TOURNAMENT PARTICIPANTS

(71) Applicant: Donald Butler Curchod, Avalon NSW (AU)

(72) Inventor: Donald Butler Curchod, Avalon NSW (AU)

(73) Assignee: Donald Butler Curchod, Avalon NSW (AU)

( * ) Notice: Subject to any disclaimer, the term of this patent is extended or adjusted under 35 U.S.C. 154(b) by 20 days.

(21) Appl. No.: 15/046,392

(22) Filed: Feb. 17, 2016

(65) Prior Publication Data

US 2016/0263462 A1    Sep. 15, 2016

Related U.S. Application Data

(60) Provisional application No. 62/117,160, filed on Feb. 17, 2015, provisional application No. 62/174,420, filed on Jun. 11, 2015.

(51) Int. Cl.
*A63F 9/24* (2006.01)
*A63B 71/06* (2006.01)
(Continued)

(52) U.S. Cl.
CPC ..... *A63B 71/0616* (2013.01); *G06Q 10/0639* (2013.01); *H04N 21/20* (2013.01);
(Continued)

(58) Field of Classification Search
None
See application file for complete search history.

(56) References Cited

U.S. PATENT DOCUMENTS 5,886,995 A    3/1999    Arsenault et al.
6,443,838 B1 *    9/2002    Jaimet ............... G06Q 50/34
463/16
(Continued)

FOREIGN PATENT DOCUMENTS

WO    WO-2015/057443 A1    4/2015

OTHER PUBLICATIONS

"FedEx Cup." *Wikipedia: The Free Encyclopedia*. Wikimedia Foundation, Inc., Mar. 11, 2016. Web. Jun. 24, 2016.
(Continued)

*Primary Examiner* — Paul A D'Agostino
(74) *Attorney, Agent, or Firm* — Mintz, Levin, Cohn, Ferris, Glovsky and Popeo, P.C.

(57) ABSTRACT

A tournament scoring program on a tournament server may receive data sanctioned by a tournament provider from a first database via a network connection. The data may include a player identification identifying a player from a group of players of an independent tournament event. The data may also include a value corresponding to the player and the independent tournament event. Cumulative score data may be generated by the tournament scoring program for the player based on the values received or a cumulative score accessed from the tournament server. Ranking data may be generated, by the tournament scoring program, for the group of players based on the cumulative score data. The tournament scoring program may transmit, from the tournament server to a website, the cumulative score data and the ranking data.

18 Claims, 7 Drawing Sheets

(51) Int. Cl.
*G06Q 10/06* (2012.01)
*H04N 21/20* (2011.01)

(52) U.S. Cl.
CPC ... *A63B 71/0622* (2013.01); *A63B 2071/0655* (2013.01); *A63B 2225/20* (2013.01); *A63B 2225/50* (2013.01)

(56) References Cited

U.S. PATENT DOCUMENTS

| | | | |
|---|---|---|---|
| 6,571,143 B1 | 5/2003 | Mallamo | |
| 9,432,444 B1 | 8/2016 | Cansino et al. | |
| 2007/0086724 A1 | 4/2007 | Grady et al. | |
| 2007/0207845 A1* | 9/2007 | Gottlieb | A63F 13/12 463/9 |
| 2007/0225056 A1 | 9/2007 | Lewis et al. | |
| 2007/0265966 A1 | 11/2007 | Kahn et al. | |
| 2007/0265967 A1 | 11/2007 | Kahn et al. | |
| 2007/0265968 A1 | 11/2007 | Kahn et al. | |
| 2007/0265970 A1 | 11/2007 | Kahn et al. | |
| 2007/0265973 A1 | 11/2007 | Kahn | |
| 2007/0265978 A1 | 11/2007 | Kahn et al. | |
| 2007/0266414 A1 | 11/2007 | Kahn et al. | |
| 2008/0089658 A1 | 4/2008 | Grady et al. | |
| 2008/0089667 A1 | 4/2008 | Grady et al. | |
| 2008/0092200 A1 | 4/2008 | Grady et al. | |
| 2008/0138028 A1 | 6/2008 | Grady et al. | |
| 2010/0004039 A1 | 1/2010 | Kelly, Jr. et al. | |
| 2010/0048302 A1* | 2/2010 | Lutnick | G07F 17/32 463/42 |
| 2012/0230651 A1 | 9/2012 | Chen | |
| 2014/0031105 A1* | 1/2014 | Givant | G07F 17/3276 463/25 |
| 2014/0370966 A1* | 12/2014 | Bahou | G07F 17/3225 463/25 |
| 2016/0263463 A1 | 9/2016 | Curchod | |
| 2016/0346661 A1 | 12/2016 | Curchod | |

OTHER PUBLICATIONS

"PGA European Tour." *Wikipedia: The Free Encyclopedia.* Wikimedia Foundation, Inc., Apr. 28, 2016. Web. Jun. 24, 2016.
"PGA Grand Slam of Golf." *Wikipedia: The Free Encyclopedia.* Wikimedia Foundation, Inc., May 16, 2016, Web. Jun. 24, 2016.
"Race to CME Globe." *Ladies Professional Golf Association. LGPA.* Web. Jun. 24, 2016.
"Samsung World Championship." *Wikipedia: The Free Encyclopedia.* Wikimedia Foundation, Inc., Apr. 8, 2016. Web. Jun. 24, 2016.
"The Players Championship," *Wikipedia: The Free Encyclopedia.* Wikimedia Foundation, Inc., Jun. 11, 2016. Web. Jun. 24, 2016.
"World Golf Championships." *Wikipedia: The Free Encyclopedia.* Wikimedia Foundation, Inc., May 13, 2016. Web. Jun. 24, 2016.
International Search Report and Written Opinion issued in International Application No. PCT/IB2016/000330, dated Jun. 14, 2016.
Official World Golf Ranking "How the Ranking Evolved", [retrieved from internet on Jun. 7, 2016]. <URL:https://web.archive.org/web/20140521025558/http://www.owgr.com/about?tabID=%7B30A8C9C7-0A88-4D29-AF92-E44EF02BB899%7D> published on May 21, 2014 as per Wayback Machine.
Official World Golf Ranking "How the Ranking System Works", [retrieved from Internet on Jun. 7, 2016]. <URL:https://web.archive.org/web/20140114055705/http://www.owgr.com/about> published on Jan. 14, 2014 as per Wayback Machine.
Official World Golf Ranking "Rankings Week 1", [retrieved from internet on Jun. 3, 2016]. <URL:https://web.archive.org/web/20140112062048/http://www.owgr.com/ranking> published on Jan. 12, 2014 as per Wayback Machine.
Stefani, R. T. "Survey of the major world sports rating systems." *Journal of Applied Statistics* vol. 24, No. 6, 1997, pp. 635-646.

* cited by examiner

Majors Series 2014

310

| Masters | Mast Place | US Open | US Open Place | WC cum stage 2 | B Open | B Open place | Cum WC stage 3 | PGA | PGA Place | WC Final | Cum stage 4 | FINAL WC posn. |
|---|---|---|---|---|---|---|---|---|---|---|---|---|
| Watson B | 1 | Kaymer | 1 | 32 | McIlroy | 1 | 32 | McIlroy | 1 | Fowler | 12 | 1 |
| Blixt | 2 | Fowler | 2 | 7 | Fowler | 2 | 9 | Stenson | 2 | McIlroy | 33 | 2 |
| Speith | 2 | Bradley | 4 | XXX | Garcia | 2 | 37 | Mickelson | 2 | Furyk | 34 | 3 |
| Fowler | 5 | Day | 4 | 24 | Furyk | 4 | 30 | Fowler | 3 | Scott | 43 | 4 |
| McIlroy | 8 | Johnson D | 4 | 59 | Leishman | 5 XXX | | Furyk | 4 | Walker | 50 | 5 |
| Walker | 8 | Stenson | 4 | 18 | Scott | 5 | 28 | Palmer | 5 | Stenson | 59 | 6 |
| Stenson | 14 | Scott | 9 | 23 | Molinari | 7 XXX | | Dubuisson | 7 | Mickleson | 81 | 7 |
| Furyk | 14 | Snedeker | 9 | 46 | Schwartzel | 7 XXX | | Walker | 7 | Day | 97 | 8 |
| Scott | 14 | Walker | 9 | 17 | Lowery | 9 XXX | | Els | 7 | Speith | 129 | 9 |
| Day | 20 | Furyk | 12 | 26 | Dubuisson | 9 XXX | | Mahan | 7 | Johnson | 171 | 10 |
| Mickleson | 28 | Speith | 17 | 19 | McDowell | 9 | | Stricker | 7 | Kaymer | 176 | 11 |
| Kaymer | 31 | McIlroy | 23 | 31 | Johnson | 12 | 71 | Snedeker | 13 | Watson B | 193 | 12 |
| Stricker | 31 | Mickleson | 28 | 87 | Mickleson | 23 | 57 | Day | 15 | | | |
| Snedeker | 37 | Dubuisson | 28 | 56 | Walker | 26 | 43 | Warren | 15 | | | |
| Els | 52 | Els | 35 | 87 | Speith | 36 | 82 | Scott | 15 | | | |
| Johnson | 52 | Garcia | 35 | 87 | Stenson | 39 | 79 | Garcia | 35 | | | |
| Dubuisson | 52 | Watson | 68 | 69 | Day | 58 | 55 | Watson | 64 | | | |
| Garcia | 52 | McDowell | | | Watson B | 60 | 102 | Kaymer | 74 | | | |
| | | | | | Kaymer | 70 | 129 | Speith | 74 | | | |
| | | | | | | | | Johnson | 100 | | | |

Fig. 3

|  | Rank (1st) | Rank (2nd) | Cum(1+2) | Final Rank |
|---|---|---|---|---|
| Player 1 | 1 | 1 | 2 | 1 |
| Player 2 | 2 | 3 | 5 | 2* |
| Player 3 | 3 | 4 | 7 | 3 |
| Player 4 | 4 | 2 | 6 | 2* |

|  | Rank(1st) | Rank (2nd) | Cum(1+2) | Final Rank |
|---|---|---|---|---|
| Player 1 | 1 | 2 | 3 | 1 |
| Player 2 | 2 | 3 | 5 | 2* |
| Player 3 | 3 | 4 | 7 | 3 |
| Player 4 | 4 | 1 | 5 | 2* |

Fig. 5

SYSTEM AND METHOD FOR RANKING OF GOLF TOURNAMENT PARTICIPANTS

CROSS-REFERENCE TO RELATED APPLICATIONS

The current application is related to/claims priority under 35 U.S.C. § 119(e) to U.S. Provisional Patent Application No. 62/117,160 filed Feb. 17, 2015 and U.S. Provisional Patent Application No. 62/174,420, filed Jun. 11, 2015, the contents of each are hereby incorporated by reference in their entirety.

TECHNICAL FIELD

The subject matter described herein relates to the generation of ranked player data from connected computing systems.

BACKGROUND

Current golf tournaments are structured to span a number of individual games, eventually culminating in tournaments such as a Major tournament. Each of the Major tournaments carries its own unique features and provides a winner for each tournament. The Major tournaments are not formally connected in any way, instead serving as prestigious individual events. Accordingly, there is no current crowing of a golf world champion.

SUMMARY

In one aspect, a tournament scoring program on a tournament server receives first data sanctioned by a tournament provider from a first database via a network connection. The first data includes a player identification identifying a player from a group of players of a first independent tournament event. The first data includes a first value corresponding to the player and the first independent tournament event.

The tournament scoring program on the tournament server receives second data sanctioned by a second tournament provider from a second database via a second network connection. The second data includes the player identification identifying the player from a second group of players of a second independent tournament event. The second data can includes a second value corresponding to the player identification and the second independent tournament event.

Cumulative score data is generated by the tournament scoring program for the player based on the first value and either the second value or a cumulative score accessed from the tournament server. Ranking data is generated, by the tournament scoring program, for the group of players based on the cumulative score data. The tournament scoring program transmits, from the tournament server to a web site, the cumulative score data and the ranking data.

In some variations one or more of the following features can optionally be included in any feasible combination.

The first value can be a first score of the player in the first independent tournament event, where the first score can be stored in the first data. Similarly, the second data can be a second score of the player in the second tournament event, the second score stored in the second data.

The generating of the cumulative score data can be performed by the tournament scoring program adding the first score to the second score to calculate the cumulative score for the player corresponding to the player identification.

Also when, for one of the players, there is no player identification in one of either the first data or the second data, that the cumulative score can be based on only the first score or only the second score added to the cumulative score.

The first value can be a first rank of the player in the first independent tournament event, where the first rank can be stored in the first data. Similarly, the second value can be a second rank of the player in the second tournament event, the second rank stored in the second data.

Generating the cumulative score data can be performed by the tournament scoring program adding the first rank to the second rank to calculate a cumulative rank for the player corresponding to the player identification.

Also when, for one of the players, there is no player identification in one of either the first data or the second data, that the cumulative rank can be based on only the first rank or only the second rank.

The cumulative score data can be updated on the tournament server in response to each receiving of the second data.

The transmitting from the tournament server to a website, of the cumulative score data and the ranking data by the tournament scoring program, can occur after the updating.

DESCRIPTION OF DRAWINGS

These and other aspects will now be described in detail with reference to the following drawings.

FIG. 3 is a table illustrating the calculation of a cumulative score based on individual tournament event rankings, according to one embodiment;

FIG. 5 is a table illustrating the determination of a required score to attain a preselected ranking, according to one embodiment;

DETAILED DESCRIPTION

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to ranking of golf tournament participants and the usage of said rankings, it should be readily understood that such features are not intended to be limiting.

As used herein, a "Major" or "independent tournament event" can be defined to include a tournament with the majority of the world's top players competing regardless of country of origin or type of Tour or sporting event.

Figure 1:
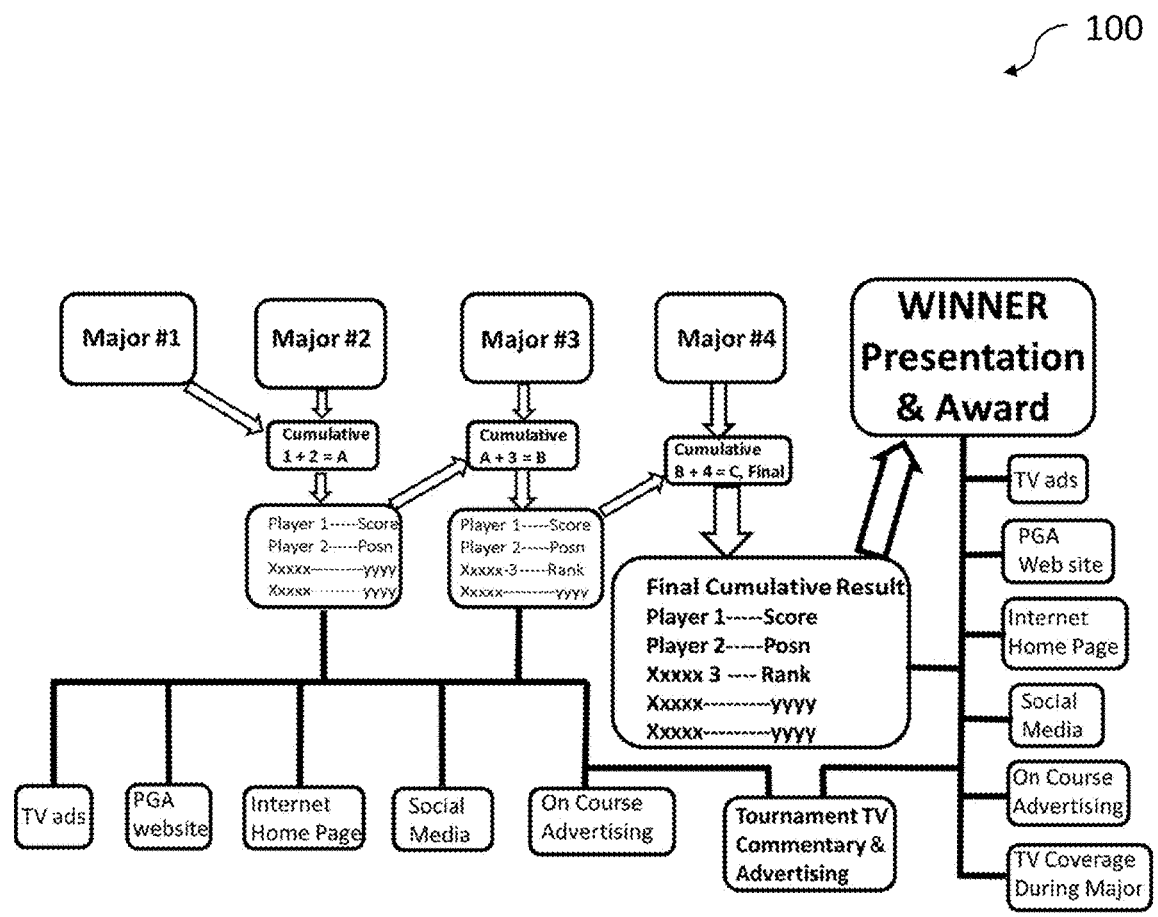
FIG. 1 is a diagram illustrating the flow of calculating a cumulative score across a series of independent tournament events, according to one embodiment.

FIG. 1 is a diagram 100 illustrating the flow of calculating a cumulative score across a series of independent tournament events. Some independent tournament events, one example in the sport of golf being the Majors, often feature players which participate in one or more of the tournaments but are not recognized for their overall accomplishments. Moreover, it is notoriously difficult for a player to win consecutive independent tournament events. Nevertheless, over the course of the independent tournament events certain players become dominant over the others, possibly having different rankings in each independent tournament event, but still maintaining their overall general position. Also, the showings in each of the independent tournament events do not necessarily carry over to the other. In this way, a player that performs consistently well, despite not winning any of the independent tournament events, can be overshadowed, perhaps undeservedly, by a player that wins one of the independent tournament events. Though the independent tournament events described herein are presented in terms of golfing events, specifically the Majors, the independent tournament events can be any type of event in any type of sport or contest. Other types of independent tournament events can further include, for example, the Women's Tour, Men's Tour, and Senior's Tour.

As shown in FIG. 1, the four Majors are represented as independent tournament events. Upon completion of the first Major, a score can be calculated for the players that participated in that Major. Upon completion of a second Major, a cumulative score can be calculated. The score or the cumulative score can be calculated in any number of ways. For example, the score or the cumulative score can be based on points under or over par, include scaling for number of holes completed, adjusted for difficulty of the independent tournament event, etc. Scores can also be based on rankings achieved during one or more of the independent tournament events.

One benefit of tracking a cumulative score is that it links previously independent events into something larger, thus encouraging interest from fans and sponsors. The cumulative score also enhances the importance of each of the independent tournament events by requiring a good showing in all of the independent tournament events in order to maintain top standing among participating players.

It is possible that not all players will participate in all of the same independent tournament events. In this case, the cumulative score for each player can be based only on the number of independent tournament events that the player participated in. While participating in less than all of the independent tournament events can detract from the cumulative score, the cumulative score can still hold value because similar players can be compared against each other.

After calculation of the cumulative score, each of the players can be ranked, for example, by score, −10, −7, +2, etc., by their relative position, $1^{st}$, $2^{nd}$, $3^{rd}$, etc., or by accumulated points based on the position of the player during each of the independent tournament events. Weighting systems can be applied to any of the individual scores or to any of the cumulative scores.

The calculation of the scores and the cumulative scores can be performed by computer software. In one implementation, a computer program can compile scores for the players from sanctioned sources, such as servers maintained or updated by the PGA, WPGA, etc. In other implementations, score data can be accessed from other servers, data repositories, or local memory storage.

A list, based on the ranking and/or the cumulative score, of the players and their performance up to this point in the series of Majors, can be provided for use by fans or sponsors. The list can be in the form of a chart, table, leaderboard, etc. The list can be displayed and promoted to television advertisers, internet advertisers, on-course advertisers, or displayed on social media sites or other internet forums. The list can also include other statistics relating to the scores, rankings, cumulative scores, or any other metric. For example, the tournament scoring program can generate comparisons with past competitions, trends, projections of future scores, etc.

The example shown in FIG. 1 describes four independent tournament events. Upon completion of the third Major, the cumulative score and ranking can be updated for those players participating in the third Major. The score for the third Major can be added to the cumulative score and the rankings recalculated accordingly. In this way, fan engagement is maintained as fans can observe the evolution of the player's position over time.

Upon completion of the fourth Major, the cumulative score can be further updated and additionally a final cumulative score can be determined (in the event of a terminal event in a series of independent tournament events). The final cumulative score can be used to determine an overall winner of the independent tournament events. Also, as discussed above, other winners can be selected according other categories, for example, a winner of the group that only participated in three of the four independent tournament events, etc. In the event of a tie, a playoff could be initiated to determine a winner, an alternate means of scoring can be imposed, or the recognition and/or awards could be shared between the tied players.

Recognition of any of the aforementioned winning players can be provided. The recognition can include, for example, award ceremonies, gala event (similar to the Academy Awards), trophies, titles, monetary prizes, future invitations to selected independent tournament events, endorsements, etc.

While the above has been described in the context of the four Majors, the system and methods described herein also apply to any number of independent tournament events. For example, if there are only three Majors in a given year, the winner can be selected based on the cumulative score of those three. Also, as has occurred historically, the number and character of these marquee tournaments have evolved. The above methods can be applied to future arrangements of these marquee independent tournament events with no loss of generality.

Figure 2:
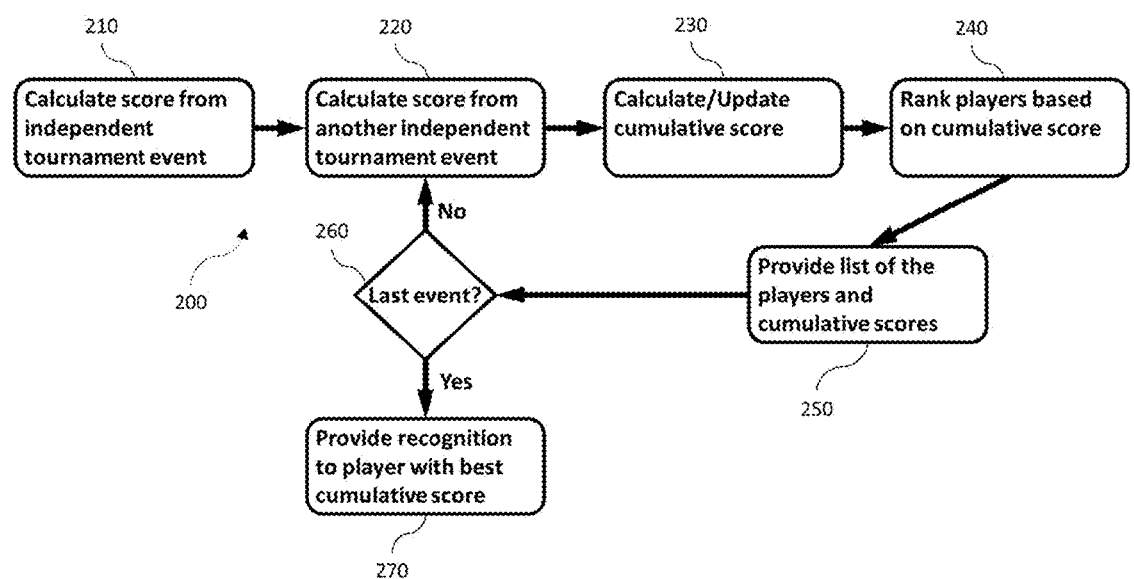
FIG. 2 is a process flow diagram illustrating the calculating the cumulative score across the series of independent tournament events, according to one embodiment.

FIG. 2 is a process flow diagram 200 illustrating the calculating the cumulative score across the series of independent tournament events. At 210, scores can be calculated for each of the players in the in the independent tournament events.

At 220, another score can be calculated from another independent tournament event.

At 230, the cumulative score is calculated and/or updated to reflect the score calculated at 220.

At 240, the ranking can be provided based on the cumulative score.

At 250, the list can be compiled and provided based on the cumulative score calculated at 230 and the ranking provided at 240.

At 260, it can be determined if the latest independent tournament event is the last event to be used in the cumulative scoring.

At 270, recognition can be provided to the player with the best cumulative score and/or ranking.

FIG. 3 is a table 310 illustrating the calculation of a cumulative score based on independent tournament event rankings. In some implementations, rather than calculating a cumulative score based on a series of independent scores, the cumulative score can be based on a players ranking during an independent tournament event. The cumulative score can be determined by adding the ranks of the players participating in each of the independent tournament events. The independent tournament events can include, for example, the World Golf Championship (WGC) Cadillac, the Masters, the Players, the U.S. Open, the British Open, the WGC Bridgestone, and the Professional Golfers Association (PGA) Championship, in any combination. In some implementations, weightings can be applied to each independent tournament event. In other implementations, only the best 6 out of every 7 independent tournament event scores can be counted towards the tournament scores. In another implementation, only the best 5 out of 6 independent tournament events can be used for the cumulative scoring described herein.

FIG. 3 shows one example where there are four independent tournament events including the Masters, US Open, British Open, and PGA Open. In each case, a partial roster of players and their rankings are shown. The first independent tournament event is the Masters, where Fowler came in $5^{th}$. The second independent tournament event is the US Open, where Fowler came in $2^{nd}$. Under this implementation, the cumulative score can be obtained by directly adding the player's rankings. For Fowler, this gives him a cumulative score of 7. The process can continue, with the tournament scoring program adding the rankings for each player at each stage. The values to be added can be accessed from, for example, a tournament server, or from the tournament scoring program. The cumulative score can be calculated, for example, after any number of independent tournament events or updated in a continuous manner after completion of another independent tournament event. The cumulative score can be transmitted to, for example, a website, server, mobile device, or the like, after the completion of a number of independent tournament events, for example, after the Majors. The cumulative score data and/or ranking data can also be transmitted to, for example, a website, server, mobile device, or the like, after an updating of the cumulative score data following another independent tournament event.

In some implementations, there can be an application running on a mobile device that can receive the transmitted cumulative score data and generate graphical and textual representations of the scores, rankings, or the like, for the players participating in the independent tournament events. The progress, scores, rankings, or the like, for the players can be transmitted to the websites, mobile applications, or the like, in real-time, or generally as soon as possible after completion of additional independent tournament events. The positions of the players as displayed can then be adjusted by the mobile device, or instructions can be sent to the mobile device specifying the new ordering of the players as determined by the tournament scoring program.

After the last independent tournament event, scores for the players that participated in all of the independent tournament events can be calculated and ranked (as shown by the Cum. Stage 4 column and the FINAL WC posn. column). From this example, Fowler would be determined to be the winner of the contest described herein.

As mentioned above, if a player does not participate in an independent tournament event, the process can reflect this in several ways. In some implementations, the player could be assigned a score of zero, and then added to the cumulative total. In this way, when, for one of the players, there is no player identification in one of either the first data or the second data (corresponding to two independent scoring events), that the cumulative rank is based on only the first rank or only the second rank. In other words, the cumulative score is not changed based on a player not participating in an independent tournament event. However, for example in golf, assigning a player a score of zero is not reflective of a lack of participation in the event. Therefore, in other implementations, if a player does not participate in an independent tournament event, then they can be removed from the cumulative score tracking from that point on. Optionally, they can be grouped with players that have completed the same set of independent tournament events and the score for those events calculated similarly to that described above.

Figure 4:
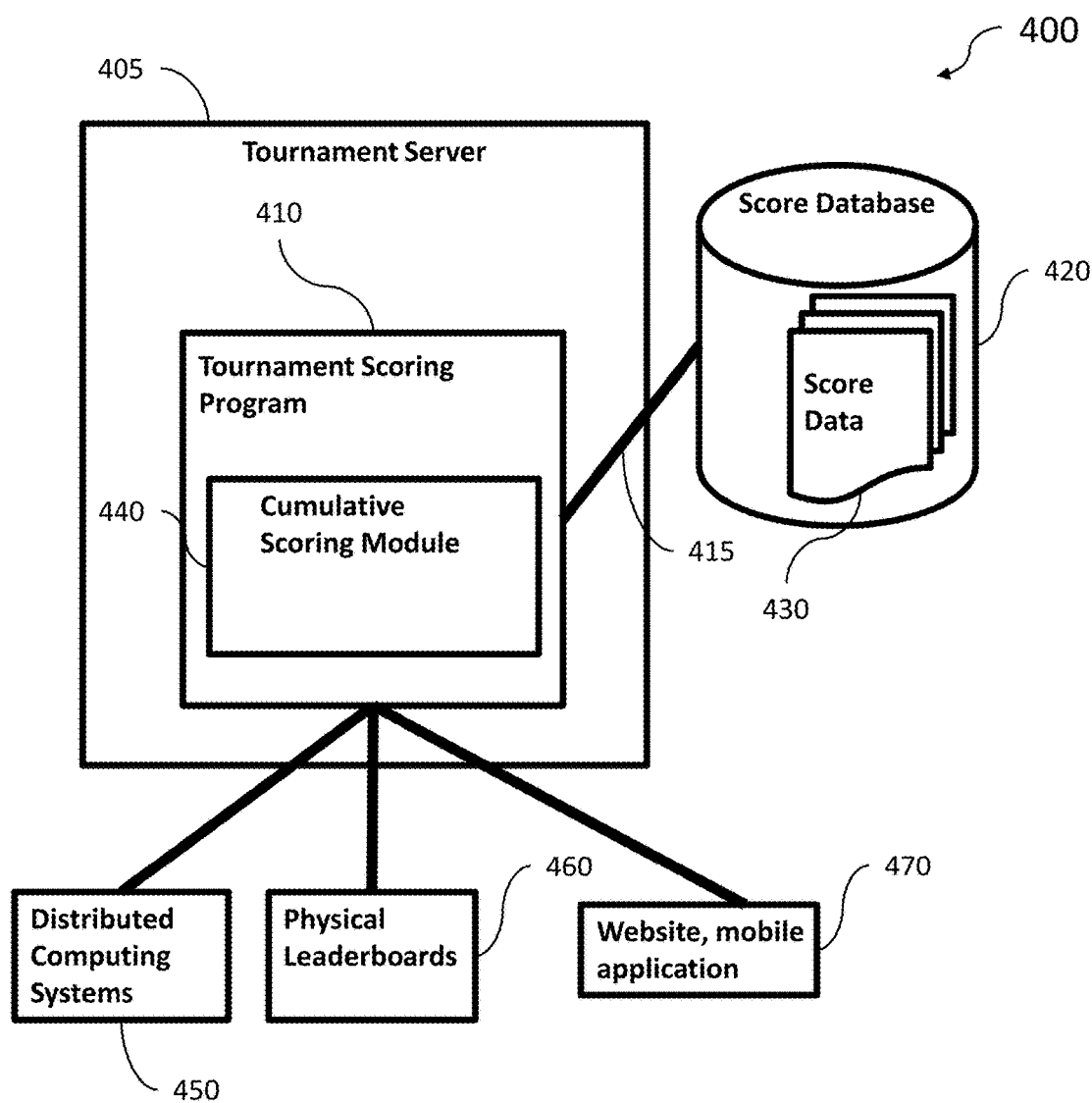
FIG. 4 is a diagram illustrating a system for calculating the cumulative score across the series of independent tournament events, according to one embodiment.

FIG. 4 is a diagram illustrating a system 400 for calculating the cumulative score across the series of independent tournament events. The tournament scoring program 410 can be implemented on, for example, a tournament server 405, which can be one or more computer systems. The tournament scoring program 410 can access a score database 420 that contains the score data 430 associated with the players participating in the independent tournament events. The score database 420, or any other computing systems described herein can, in some implementations, be connected by one or more network connections 415. The network connections 415 can be, for example, a local area network, wireless local area network, the Internet, wireless data connections, or the like. In some implementations, the score database 420 can be any sanctioned provider of the score data 430, such as PGA servers, WPGA servers, etc. As used herein, "sanctioned" refers to having official scores or rankings that are recognized as correct by the providers of the independent tournament events. In other implementations, the score data can be provided by other computer systems, or accessed locally by the tournament scoring program.

As used herein, "score data" can include, for example, scores, rankings, player identifications, contest identifiers, player handicaps that modify the score data or the calculation of the cumulative score, or the like. Again, as noted above, rankings can be used instead of scores to determine the placement of the players according to the cumulative scoring methods described herein. In this way, "scores", as used herein, can refer to any metric that is used by the tournament scoring program. For example, scores can be actual scores, rankings, or the like.

The score data 430 can be input to a cumulative scoring module 440 to calculate the cumulative score. The cumulative scoring module 440 can be a dedicated computer program that computes the cumulative score. This can be distinct from the tournament scoring program which can also execute, for example, operations of receiving score data and transmitting the cumulative scores, etc. The cumulative score, the rankings, and other data can be transmitted to distributed computing systems 450 such as internet websites, news outlets, social media sites, etc. The cumulative score can also be transmitted to physical leaderboards 460, such as on-course boards or advertisements, billboards, publications, or other physical realizations of the cumulative score and rankings. The cumulative score can also be transmitted to, for example, websites 470, mobile applications, or the like. The cumulative score can be generated as text or graphics on a graphical user interface, computer screen, mobile phone screen, or the like.

In order to preserve the Majors as a separate entity from the cumulative scoring methods and presentations described herein, the transmitting of the cumulative scores can be to personal displays accessible by, for example, players, staff, fans, or the like, but not necessarily broadcast publicly during the Majors events. The personal displays can again be displays on mobile applications, websites, leaderboards, or the like. In some implementations, the cumulative scores can be provided only to personal devices accessible by the players and not to the public at large.

FIG. 5 is a table illustrating the determination of a required score to attain a preselected ranking, according to one embodiment.

In some implementations, a real-time (or nearly so) calculation of what position a golfer needs to finish in a particular place can be determined. The determination can be performed for a given independent tournament event. In some implementations, the determination can be performed by calculating permutations of the scores of the remaining players to determine the highest possible scoring of the player after the next event. The table shown in FIG. 5 includes a first row 510 and a second row 560. The first row 510 contains scores for four players, which, in this example have an initial ranking of 1 through 4, in order, after the first independent tournament event 520. As one permutation, a hypothetical second independent tournament event 530, can be where all other players retain their relative positions except for player 4, who comes in $2^{nd}$. The cumulative score 540 can be determined as described herein and a final rank 550 determined. Here, based on the change in rankings at 530, the best that player 4 can do is tie for $2^{nd}$ place. Similarly, in the second row 560, a permutation is shown where player 4 comes in $1^{st}$ in the second independent tournament event 530. This again results in a two way tie for $2^{nd}$ place. In a similar manner, the permutations can be calculated and provided to websites, mobile applications, or the like, to show where a player can move to in the rankings, after a subsequent independent tournament event, subject to certain constraints for the other players. This feature, as well as other features described herein, allow there to be more interest beyond just the player that finishes first. Because a players rankings can move over time, not just in response to their own performance, but in the performance of their competitors, a player can perform well in the cumulative scoring sense by consistently performing well across all independent tournament events without having to win any or all of them (e.g. a player perform in each independent tournament event in as low as $5^{th}$ or $6^{th}$, for example, if the other competitors perform much worse in at least one other independent tournament event).

Figure 6:
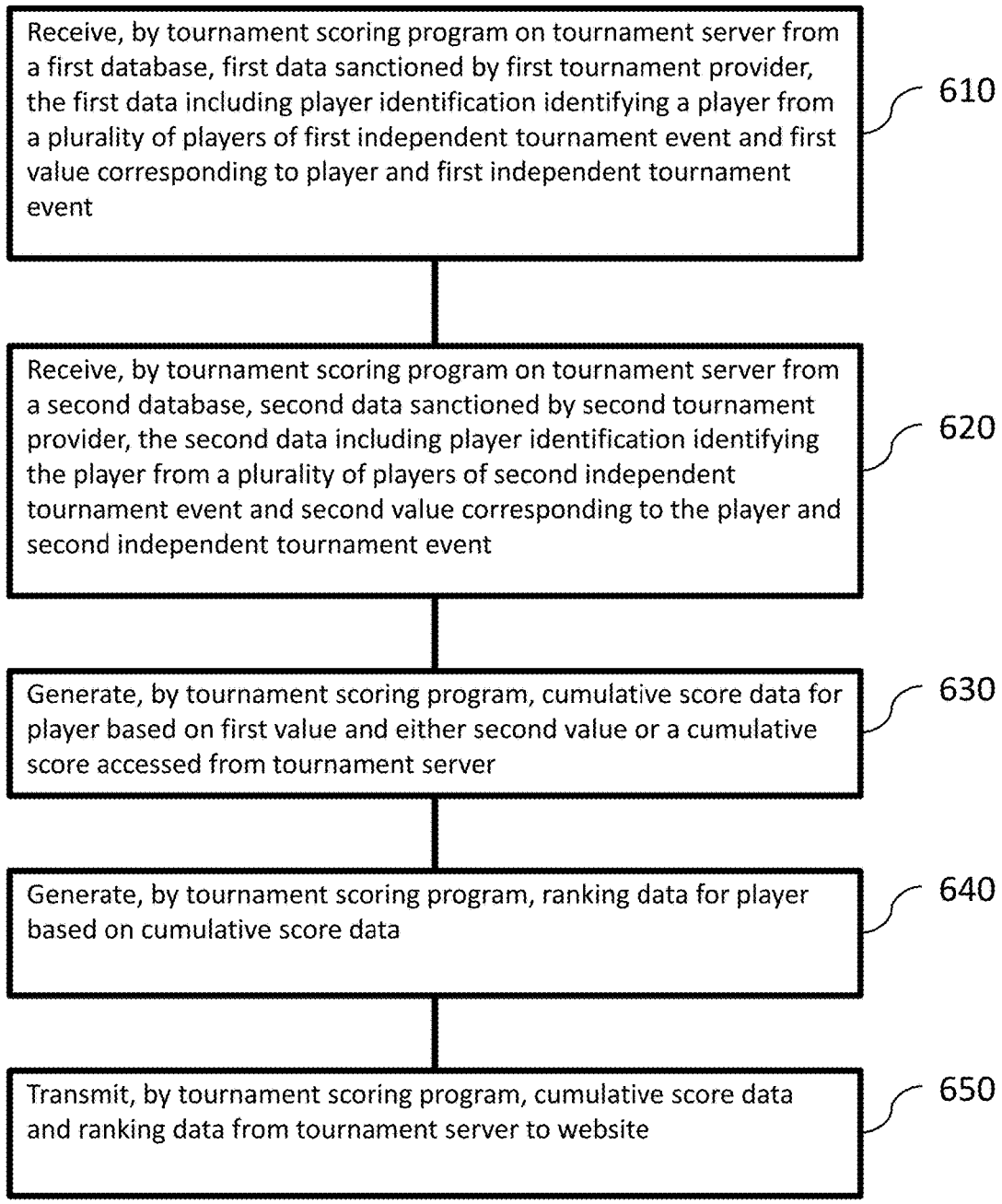
FIG. 6 is a process flow diagram illustrating determination of a cumulative score, according to one embodiment.

FIG. 6 is a process flow diagram illustrating determination of a cumulative score, consistent with some implementations of the current subject matter.

At 610, a tournament scoring program on the tournament server, can receive, from a first database via a first network connection, first data sanctioned by a first tournament provider. The first data can include a player identification identifying a player from a number of players of the first independent tournament event and also include a first value corresponding to player and the first independent tournament event.

At 620, the tournament scoring program can receive, from a second database via a second network connection, second data sanctioned by a second tournament provider. The second data can include the player identification identifying the player from a number of players of the second independent tournament event and also include a second value corresponding to player and the second independent tournament event. The first and/or the second data can include scores, rankings, or the like.

At 630, cumulative score data can be generated by the tournament scoring program for the player based on first value and either second value or a cumulative score accessed from tournament server. For example, the cumulative score data can be based on a previously calculated and stored cumulative score, to which score data for another independent tournament event can be added.

At 640, ranking data for at least one player based on cumulative score data can be generated by the tournament scoring program. Again, the ranking data can include ranks of the players participating in some or all of the independent scoring events. The ranks can be determined by any of the methods described above, for example, adding individual player scores across independent tournament events or adding individual player rankings across independent tournament events.

At 650, cumulative score data and/or ranking data can be transmitted, by the tournament scoring program, from the tournament server.

Figure 7:
FIG. 7 is a diagram illustrating television rebroadcasts of independent tournament events, according to one embodiment.

FIG. 7 is a diagram illustrating television rebroadcasts of independent tournament events, according to one embodiment. In addition to television broadcasts of the Majors (including sub-majors such as the Men's Tour, Women's Tour, and Seniors Tour), there can be rebroadcasts of each independent tournament event. The rebroadcast can include, for example, cumulative coverage, presentation of cumulative scores and/or rankings to track player progress, highlights of prior independent tournament events, leaderboards, or the like.

After the last independent tournament event is concluded, there can optionally be a series playoff that includes any number of leaders based on the cumulative score. For example, the series playoff can be between the top 2, 5, 10, 20, players. The series playoff can be moved and played at any time after the completion of the independent tournament events. After the playoff is concluded, or if no playoff is performed then at any point where a winner is determined based on the cumulative score, a world champion can be determined and recognized.

After the series playoff, there can be a world championship award show that can include an academy award style gala and a television presentation of awards, prizes, and other recognition to the player that has received the highest cumulative score. In some implementations, runner-ups can also be recognized in a similar manner. Any or all of these events can include one or more sponsors to provide funds in exchange for advertisement and promotion of the events and their respective brands.

For years in which there was no series playoff or world championship award, there can be retroactive determination of winners, runner-ups, or the like, according to any of the scoring or ranking methods described herein. These retroactive determinations can then be recognized with awards, prizes, and rebroadcasts of the original independent tournament events, also as described herein.

Implementations of the current subject matter can include, but are not limited to, articles of manufacture (e.g. apparatuses, systems, etc.), methods of making or use, compositions of matter, or the like consistent with the descriptions provided herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, or the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Because of the high-level nature and complexity of the selections and methods described herein, including the multiple and varied combinations of different calculations, computations and selections, such selections and methods cannot be done in real time quickly, or at all, by a human. The processes described herein rely on the machines described herein.

What is claimed is:

1. A system comprising:
   at least one programmable processor; and
   a non-transient machine-readable medium storing instructions which, when executed by the at least one programmable processor, result in operations comprising:
      receiving, by a tournament scoring program on a tournament server from a first database via a first network connection, first data sanctioned by a first tournament provider, the first data comprising:
         a first plurality of player identifiers identifying a first plurality of players participating in a first golf tournament from a series of independent golf tournaments; and
         a first plurality of values, each value of the first plurality of values corresponding to an individual player from the first plurality of players and the first golf tournament;

receiving, by the tournament scoring program from a second database via a second network connection, second data sanctioned by a second tournament provider, the second tournament provider independent from the first tournament provider, the second data comprising:
   a second plurality of player identifiers identifying a second plurality of players participating in a second golf tournament from the series of independent golf tournaments; and
   a second plurality of values, each value of the second plurality of values corresponding to an individual player from the second plurality of players and the second golf tournament;

generating, by the tournament scoring program, cumulative data for a third plurality of players based on the first plurality of values and the second plurality of values, the third plurality of players comprising an intersection between the first plurality of players and the second plurality of players;

generating, by the tournament scoring program, ranking data for the third plurality of players based on the cumulative data; and transmitting, by the tournament scoring program, the ranking data from the tournament server to a user device for display on the user device.

2. The system of claim 1, wherein each value of the first plurality of values comprises a first score of a corresponding individual player from the first plurality of players in the first golf tournament, and wherein each of the second plurality of values comprises a second score of a corresponding individual player from the second plurality of players in the second golf tournament.

3. The system of claim 2, wherein the generating of the cumulative score data is based on the tournament scoring program adding, for each participating player of the third plurality of players, the first score for the participating player to the second score for the participating player to calculate a cumulative score for the participating player.

4. The system of claim 1, wherein the operations further comprise:
   receiving, by the tournament scoring program from a third database via a third network connection, third data sanctioned by a third tournament provider, the third tournament provider independent from the first tournament provider and the second tournament provider, the third data comprising:
     a third plurality of player identifiers identifying a fourth plurality of players participating in a third golf tournament from the series of independent golf tournaments; and
     a third plurality of values, each value of the third plurality of values corresponding to an individual player from the fourth plurality of players and the third golf tournament;
   updating, by the tournament scoring program, the cumulative data for the third plurality of players based on the cumulative data and the third plurality of values;
   updating, by the tournament scoring program, the ranking data for the third plurality of players based on the updated cumulative data; and
   transmitting, by the tournament scoring program, the updated ranking data from the tournament server to the user device for display on the user device.

5. The system of claim 1, wherein the cumulative score data is generated in response to the tournament scoring program receiving the second data.

6. The system of claim 1, wherein the operations further comprise:
   generating, by the tournament scoring program, second cumulative score data for a fourth plurality of players based on the first plurality of values, the fourth plurality of players comprising a subset of the first plurality of players that do not intersect with the second plurality of players; and
   generating, by the tournament scoring program, third cumulative score data for a fifth plurality of players based on the second plurality of values, the fifth plurality of players comprising a subset of the second plurality of players that do not intersect with the first plurality of players.

7. The system of claim 1, wherein each value of the first plurality of values comprises a first rank of a corresponding individual player from the first plurality of players in the first golf tournament, and wherein each of the second plurality of values comprises a second rank of a corresponding individual player from the second plurality of players in the second golf tournament.

8. The system of claim 7, wherein the generating of the cumulative score data is based on the tournament scoring program adding, for each participating player of the third plurality of players, the first rank for the participating player to the second rank for the participating player to calculate a cumulative rank for the participating player.

9. A computer program product comprising a non-transient, machine-readable medium storing instructions which, when executed by at least one programmable processor, cause the at least one programmable processor to perform operations comprising:
   receiving, by a tournament scoring program on a tournament server from a first database via a first network connection, first data sanctioned by a first tournament provider, the first data comprising:
     a first plurality of player identifiers identifying a first plurality of players participating in a first golf tournament from a series of independent golf tournaments; and
     a first plurality of values, each value of the first plurality of values corresponding to an individual player from the first plurality of players and the first golf tournament;
   receiving, by the tournament scoring program from a second database via a second network connection, second data sanctioned by a second tournament provider, the second tournament provider independent from the first tournament provider, the second data comprising:
     a second plurality of player identifiers identifying a second plurality of players participating in a second golf tournament from the series of independent golf tournaments; and
     a second plurality of values, each value of the second plurality of values corresponding to an individual player from the second plurality of players and the second golf tournament;
   generating, by the tournament scoring program, cumulative data for a third plurality of players based on the first plurality of values and the second plurality of values, the third plurality of players comprising an intersection between the first plurality of players and the second plurality of players;
   generating, by the tournament scoring program, ranking data for the third plurality of players based on the cumulative data; and transmitting, by the tournament scoring program, the ranking data from the tournament server to a user device for display on the user device.

10. The computer program product of claim 9, wherein each value of the first plurality of values comprises a first score of a corresponding individual player from the first plurality of players in the first golf tournament, and wherein each of the second plurality of values comprises a second score of a corresponding individual player from the second plurality of players in the second golf tournament.

11. The computer program product of claim 10, wherein the generating of the cumulative score data is based on the tournament scoring program adding, for each participating player of the third plurality of players, the first score for the participating player to the second score for the participating player to calculate a cumulative score for the participating player.

12. The system of claim 9, wherein the cumulative score data is generated in response to the tournament scoring program receiving the second data.

13. The system of claim 9, wherein the operations further comprise:
   generating, by the tournament scoring program, second cumulative score data for a fourth plurality of players based on the first plurality of values, the fourth plurality of players comprising a subset of the first plurality of players that do not intersect with the second plurality of players; and
   generating, by the tournament scoring program, third cumulative score data for a fifth plurality of players based on the second plurality of values, the fifth plurality of players comprising a subset of the second plurality of players that do not intersect with the first plurality of players.

14. A method for implementation by at least one data processor, the method comprising:
   receiving, by a tournament scoring program on a tournament server from a first database via a first network connection, first data sanctioned by a first tournament provider, the tournament server comprising the at least one data processor, the first data comprising:
      a first plurality of player identifiers identifying a first plurality of players participating in a first golf tournament from a series of independent golf tournaments; and
      a first plurality of values, each value of the first plurality of values corresponding to an individual player from the first plurality of players and the first golf tournament;
   receiving, by the tournament scoring program from a second database via a second network connection, second data sanctioned by a second tournament provider, the second tournament provider independent from the first tournament provider, the second data comprising:
      a second plurality of player identifiers identifying a second plurality of players participating in a second golf tournament from the series of independent golf tournaments; and
      a second plurality of values, each value of the second plurality of values corresponding to an individual player from the second plurality of players and the second golf tournament;
   generating, by the tournament scoring program, cumulative data for a third plurality of players based on the first plurality of values and the second plurality of values, the third plurality of players comprising an intersection between the first plurality of players and the second plurality of players;
   generating, by the tournament scoring program, ranking data for the third plurality of players based on the cumulative data; and
   transmitting, by the tournament scoring program, the ranking data from the tournament server to a user device for display on the user device.

15. The method of claim 14, wherein each value of the first plurality of values comprises a first score of a corresponding individual player from the first plurality of players in the first golf tournament, and wherein each of the second plurality of values comprises a second score of a corresponding individual player from the second plurality of players in the second golf tournament.

16. The method of claim 15, wherein the generating of the cumulative score data is based on the tournament scoring program adding, for each participating player of the third plurality of players, the first score for the participating player to the second score for the participating player to calculate a cumulative score for the participating player.

17. The method of claim 14, wherein the cumulative score data is generated in response to the tournament scoring program receiving the second data.

18. The method of claim 14, further comprising:
   generating, by the tournament scoring program, second cumulative score data for a fourth plurality of players based on the first plurality of values, the fourth plurality of players comprising a subset of the first plurality of players that do not intersect with the second plurality of players; and
   generating, by the tournament scoring program, third cumulative score data for a fifth plurality of players based on the second plurality of values, the fifth plurality of players comprising a subset of the second plurality of players that do not intersect with the first plurality of players.

* * * * *